United States Patent [19]

Lewicki, Jr. et al.

[11] 4,070,435
[45] Jan. 24, 1978

[54] MULTILEVEL EMBOSSING OF FOAMED-SHEET MATERIALS-II

[75] Inventors: Walter J. Lewicki, Jr., Lancaster; William M. McQuate, Reinholds; Richard M. Ringer, Lancaster, all of Pa.

[73] Assignee: Armstrong Cork Company, Lancaster, Pa.

[21] Appl. No.: 766,941

[22] Filed: Feb. 9, 1977

Related U.S. Application Data

[63] Continuation of Ser. No. 626,727, Oct. 29, 1975, abandoned.

[51] Int. Cl.² .................................................. B29D 27/00
[52] U.S. Cl. ..................................... 264/284; 156/220
[58] Field of Search ............................................ 264/284

[56] References Cited

U.S. PATENT DOCUMENTS

| | | | |
|---|---|---|---|
| 3,246,365 | 4/1966 | Kloender | 264/284 X |
| 3,619,344 | 11/1971 | Wolinski | 156/282 |
| 3,741,851 | 6/1973 | Erb | 156/220 |
| 3,887,409 | 6/1975 | McCreany et al. | 156/220 |
| 3,887,678 | 6/1975 | Lewicki | 264/284 |

*Primary Examiner*—Richard R. Kucia

[57] ABSTRACT

The process herein is used for achieving multilevel mechanical embossing of a fused or cured wear layer in register with a print on an expanded foam thereunder. The expansion of the decorative foam and fusion of the wear layer are carried out and then the back of the foam is cooled by wetting and liquid evaporation. The wear layer is maintained at a high temperature for embossing and is embossed with registry between the embossed pattern and the printed pattern on the foam. Just prior to embossing, the decorative foam-wear layer web is wrapped around the backup roll of the embossing apparatus, and after embossing, is wrapped partially around the embossing roll of the embossing apparatus.

9 Claims, 1 Drawing Figure

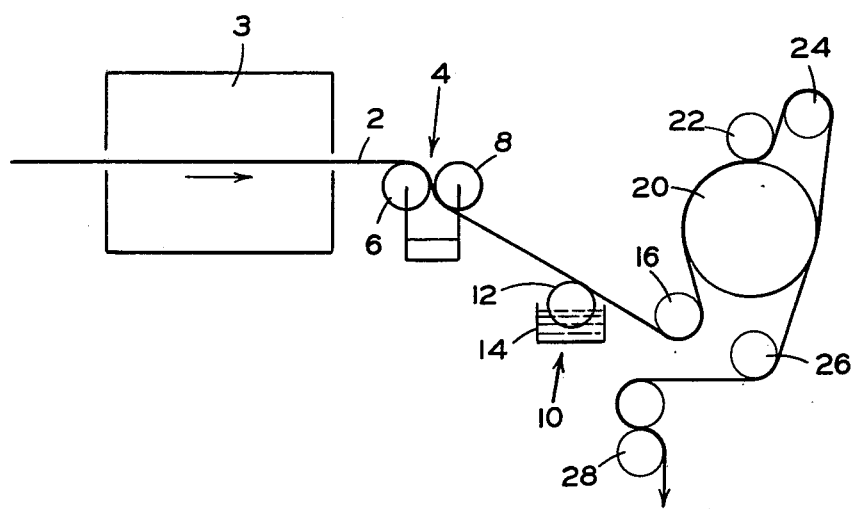

MULTILEVEL EMBOSSING OF FOAMED-SHEET MATERIALS-II

CROSS-REFERENCE TO RELATED APPLICATION

This is a continuation, of application Ser. No. 626,727, filed Oct. 29, 1975, now abandoned.

CROSS-REFERENCE TO RELATED APPLICATIONS

This application is an improvement over the technique disclosed in U.S. Application Ser. No. 554,321, entitled "MULTILEVEL EMBOSSING OF FOAMED-SHEET MATERIALS", filed Feb. 28, 1975 in the name of Walter J. Lewicki, Jr. et al and commonly assigned to the owner of this application.

BACKGROUND OF THE INVENTION

1. Field of the Invention

The invention is directed to a process for manufacturing floor covering material and, more particularly, to a process for the mechanical embossing of a pattern on a floor covering material.

2. Description of the Prior Art

U.S. Pat. No. 3,741,851 discloses a product and process which deals with a foamed vinyl floor covering. A printed color pattern or design is provided between a foam resin layer and a transparent resin layer. Embossing is carried out relative to the transparent resin layer and the embossing is carried out in register with the printed pattern.

U.S. Pat. No. 3,176,058 is directed to an apparatus for embossing sheet material. Water cooling means are provided to cool either one or both sides of the sheet prior to embossing.

U.S. Pat. No. 3,305,419 is directed to an apparatus for embossing a foam-backed polyurethane sheet. Surface heating is carried out to heat only the surface to be embossed so that there will be no damage to the underlying foam layer.

U.S. Pat. No. 3,196,062 is directed to a process wherein cooled embossing rolls are utilized to provide an embossed pattern on a sheet material which is composed of a foamable thermoplastic resin base and a thermoplastic resin top coating. Surface heating of the thermoplastic resin is carried out just prior to embossing.

U.S. Pat. No. 2,723,937 is directed to a product for embossing a floor covering material wherein embossing is carried out by embossing roll 21 in cooperation with backup rolls 20 and 23.

U.S. Pat. No. 3,776,797 is directed to an embossing structure wherein embossing is carried out with an embossing roll 22 and backup rolls 23 and 25.

U.S. Pat. No. 3,246,365 is directed to an embossing apparatus using plural embossing rolls and backup rolls.

Finally, U.S. Pat. No. 3,338,731 is directed to a process for embossing poly(vinyl chloride) coatings on a support base.

SUMMARY OF THE INVENTION

In the inventive process herein, the expansion of a decorated foam and the fusion of a wear layer thereover are completed in an earlier step in the same manufacturing process in which the embossing is carried out. In other words, the embossing operation is carried out at the end of the processing line which forms the expanded foam product with a fused or cured wear layer. The wear layer is maintained at its high surface temperature while the foam backing is cooled on its back side by the combination steps of back wetting and drum cooling, or simply by back wetting alone. Appropriate guide structures and controls feed the combination foam layer-wear layer structure into an embossing structure so that the embossed pattern will be placed on the combination wear layer-foam layer web in registry with the printed design on the surface of the decorated foam. Due to the back wetting and/or drum cooling, there will be a 100° F. to 150° F. (38° C. to 66° C.) difference between the surface of the wear layer being embossed and the back surface of the foam which is displaced away from the surface being embossed. The combination foam layer-wear layer web is partially wrapped around the backup roll of the embossing apparatus prior to the time the combination layer web is fed into the nip between the embossing roll and the backup roll of the embossing apparatus. After the combination layer web passes through the nip of the embossing roll and the backup roll, it is wrapped around a portion of the surface of the embossing roll.

Utilizing this invention, in conjunction with shallow embossing rolls having a greater area of surface embossing, mechanical embossing capabilities with controllable embossing depths and visual end products on foam structures are enhanced considerably over that found in the prior art. In addition, the combination of back wetting and drum cooling permits increased production capabilities, as well as providing for multilevel embossing of thick foam layers. The wrap around of the combination layer web around the backup roll provides for a positive engagement between the backup roll and web, which is actually driving the combination backup roll and embossing roll. The wrapping of the combination layer web around the embossing roll helps to improve the definition of the embossed pattern in the wear layer surface, particularly with combination layer webs that have a thick foam layer.

BRIEF DESCRIPTION OF THE DRAWING

The FIGURE of the drawing is a schematic showing of the process and apparatus for carrying out the invention herein.

DESCRIPTION OF THE PREFERRED EMBODIMENTS

The invention herein is an alternate process for the manufacturing of the product of U.S. Pat. No. 3,741,851 and the manufacturing technique disclosed in copending U.S. application Ser. No. 554,321.

In the above-mentioned patent, the oven 18 shown in FIG. 2 serves to fuse the resin materials and decompose the blowing agent uniformly throughout the area of the product. Thereafter, the web is passed while still hot, for instance, while at a temperature of from about 225° F. (107° C.) to about 325° F. (163° C.) through an embossing structure. The invention herein deals with the passing of the web in U.S. Pat. No. 3,741,851 from the oven 18 to and through the inventive embossing roll structure of the drawing of this disclosure.

The warm web 2, which would move from the oven structure 3, passes around a conventional guider structure 4 which simply maintains the registry of the printed pattern of the web with the embossing roll pattern in a direction transverse to the direction of web movement. The guider structure is composed of two guide rolls 6 and 8. The back of the web will pass over roll 6 and then the web will pass under roll 8, with the roll surface in contact with the surface of the web to be embossed. This surface will be quite warm and, therefore, roller 8 should be covered with a "Teflon*TM*" coating to prevent sticking of the upper embossable surface of the web against the surface of the roll 8. This roll 8 is usually maintained at a surface temperature of 200° F. to 250° F. (93° C. to 121° C.) in order to maintain a hot embossable surface. The assembly 4 is a commercially available "Kamberoller*TM*" which consists of two angled guide rolls on a carriage mounted for transverse movement. The transverse guiding of the sheet is carried out through the use of the "Kamberoller*TM*", but could equally well be carried out by simply the use of guide bars which are placed along the edge of the web and would guide the web edge and, therefore, the pattern edge relative to the embossing roll farther down the processing line. U.S. Pat. Nos. 3,024,955 and 2,797,091 show typical "Kamberoller*TM*" structures.

The web then passes over a back wetting structure 10 which is preferably a felt-covered roller 12 partially immersed in a bath of liquid 14. The felt-covered roller 12 of the back wetting structure 10 could be replaced by a steel roller, or even a water spray system. The back wetting structure applies water to the back side, the area of the web not to be embossed, so as to cool the back side and stabilize the hot thermoplastic foam next to the back side of the web. The application of the water and its evaporation on the back side of the web cools the back side of the web and its adjacent foam layer to 125° F. to 200° F. (52° C. to 93° C.) by the time the web enters the embossing apparatus. The rate of water application is governed by the quantity of heat to be removed from the hot thermoplastic foam next to the back side of the web to keep the printed foam from distorting and blistering at the embossing nip. Meanwhile, the upper surface, the embossable surface, of the web is at about 215° F. to 300° F. (99° C. to 149° C.). Under some circumstances, a "Teflon*TM*" coated roll 16 may be utilized to provide additional heat to the top surface of the web to compensate for heat loss which may occur as the web is moving through ambient air from the oven towards the embossing structure. The roll 16 is also used to cause wrapping of the web of material around a portion of the backup roll of the embossing structure to be described below.

The embossing structure is basically composed of a backup roll 20, an embossing roll 22, and a guide roll or definition roll 24. The backup roll and embossing roll can be driven by separate power sources. However, it is contemplated according to this invention that they are coupled together through a power transmission system as described in U.S. Pat. No. 3,741,851. Roll 16 will cause the web to be partially wrapped around the steel backup roll 20 before embossing is carried out by the embossing roll 22. The backup roll will be cooled by chilled water so that the backup roll has a surface temperature of about 75° F. to 100° F. (24° C. to 38° C.) and this chilled backup roll 20 will function to further cool the back side of the web prior to the time that embossing is carried out. Consequently, the steel backup roll 20 is functioning both as a cooling drum and as a backup roll for the embossing roll 22. Partial wrapping of the web around the backup roll 20 provides for a good frictional contact between these two. Pull rolls 28 draw the web 2 through the processing apparatus. Due to the wrap of the web on the backup roll 20, a rotational movement of this roll is provided which is necessary to drive the embossing roll. After the web of material passes through the nip between embossing roll 22 and backup roll 20, the definition roll 24 causes the web to partially wrap around the embossing roll 22. This helps improve the definition of the pattern being embossed in the web since the embossing structure is maintained in contact with the web while the web is chilling to a degree. The web may then move back into contact with the backup roll 20 and then be directed on down through further processing by another guide roll 26, or the web could simply be moved directly to the guide roll 26 without further contact with the backup roll 20.

Since there is a need to register the embossing pattern with the printed pattern of the web, there must be control of the embossing roll pattern relative the printed pattern to get registry between the two patterns. This will require registry along the machine direction, and this registry along the machine direction or in the direction longitudinally of the sheet movement is maintained in the same manner as set forth in U.S. Pat. No. 3,655,312, Column 5, line 53, to Column 6, line 41. The technique of U.S. Pat. No. 3,694,634 and U.S. Pat. No. 3,741,851 can be adopted herein for machine direction registry also. Finally, registry in the machine direction can be secured using Model R-500 Digital Control and Model R-425-1 Feathering Drive Control of "Registron*TM*" Division of Bobst Champlain, Inc. At this point, it should be noted that registration controls, both across the machine direction and along the machine direction, are necessary to secure a commercially acceptable product with registration between the embossed pattern and the printed pattern, but such controls are not part of the invention herein, since they are conventional in the art. The essence of the invention herein is in the utilization of the particular embossing roll structure shown in the drawing. For thin foam materials [0.030–0.045 inches (.08–0.11 cm)], for which the embossing roll structure herein is particularly adaptable, the utilization of back wetting for the purpose of cooling the back side of the web and adjacent foam layer is necessary. For foam webs having considerable thicknesses [0.100–0.120 inches (0.25 cm to 0.3 cm)] which retain their internal heat, it has been found that the back wetting structure 12 plus drum cooling as supplied by backup roll 20 is needed. With even thicker foams or intricate patterns, this may need to be supplemented by even a further back wetting structure which could be placed before the "Kamberoller*TM*".

It should be noted that the embossing rolls of U.S. Pat. No. 3,741,851 have "bottomless" embossing roll valleys and, therefore, do not emboss the web except with the embossing roll land areas. In the embossing roll structure 22 herein, both the roll land and valley areas make contact and emboss the web. This increased area of embossing is not possible in the structure of U.S. Pat. No. 3,741,851. In the structure of that patent, the embossing area can only be 25% of the total sheet area, whereas in the embossing roll structure herein, the embossing area can go to 80% to 90% of the total sheet area. Normally, the embossed area will cover 30% to 90% of the total sheet area. If the material of U.S. Pat. No. 3,741,851 were utilized through the embossing apparatus generally described above and no back wetting or cooling carried out, it has been found that the web will enter the embossing roll nip with a temperature on the embossing surface of 220° F. (104° C.) and a temperature on the back of the web, the non-embossed surface, of about 270° F. (132° C.). Under these conditions, the center of the foam of the web will be measured at about 300° F. (149° C.) and this is an ideal condition for blistering within the foam layer. Blistering provides an unacceptable product. The back wetting eliminates this problem. This back wetting is basically the invention of copending U.S. patent application Ser.No. 554,321. This application further improves upon the invention of that application by providing the specific embossing roll structure described above and shown in the drawing.

In operation, the web to be embossed is wrapped around the backup roll for about 38% of its surface area, and can be utilized with a wrap around in a range of 30% to 75% of the surface area of the backup roll, so as to secure the necessary drive of the backup roll by the web. The embossing roll 22 is normally maintained cold at about 75° F. to 100° F. (24° C. to 38° C.), to freeze in the desired pattern which is being embossed in the web. Due to the use of definition roll 24, the web will be partially wrapped around the embossing roll 22 to further assist in the freezing of the desired pattern in the surface being embossed. The wrap around covers approximately 8.5% of the embossing roll surface and may cover a range of embossing roll surface ranging from 0% to 20% of the total embossing roll surface.

The material described in U.S. Pat. No. 3,741,851 could come from the oven 18 of that patent and pass through the appropriate guiding structures by the back wetting roll 10 around the backup roll 20 and around the embossing roll 22 and be embossed without any blistering in the end product with very good registration between the embossed pattern and the printed pattern and with the embossing carried out so that there is "bottoming out" of the embossing roll against the embossed surface of the web. Cooling of the back surface of the web prior to the embossing directly attributes to the lack of blistering and the ability to carry out a "bottoming out" of the embossing roll while still maintaining registry. Wrapping of the web around the backup roll provides for good positive drive of the backup roll plus embossing roll and wrapping of the web around the embossing roll 22 improves the pattern definition in the embossed product.

Even though this invention can provide for unique embossed designs on wear layers composed of vinyl compositions as described in U.S. Pat. No. 3,741,851, the embossing of additional non-vinyl wear layers is possible. For example, it is also possible to emboss a cured thermoset wear layer web which has a foam underlayer. This particular product will be made by placing a plastisol on a carrier web such as that disclosed in U.S. Pat. No. 2,759,813. The following plastisol is prepared by thoroughly mixing the following ingredients:

| Ingredients | Parts by Weight |
| --- | --- |
| Poly(vinyl chloride) | 100 |
| Dioctyl phthalate (plasticizer) | 49.55 |
| Octyl epoxy phthalate (stabilizer) | 5.0 |
| Titanium dioxide | 3.6 |
| Azodicarbonamide (blowing agent) | 2.3 |
| Talc | 0.6 |
| Zinc octuate (blowing agent activator) | 1.95 |

This above plastisol is applied to the above-described carrier which is a coated beater-saturated asbestos sheet having a thickness of about 0.028 inches (0.07 cm). The plastisol is applied with a reverse roll coater to a wet thickness of 10 mils (0.025 cm). The plastisol-coated backing is gelled in a hot air oven for one minute to an exit temperature of 270° F. (132° C.). This sheet is then cooled and a printed design is placed thereon. The printed design may be any particular pattern and could be of the same pattern shown in FIG. 3 of U.S. Pat. No. 3,741,851. Inks are prepared by thoroughly mixing the following ingredients:

| Ingredients | Parts by Weight |
| --- | --- |
| Vinyl binder | 33.0 |
| Pigment | 12.8 |
| Cellosolve acetate | 1.6 |
| 2-nitropropane | 50.0 |
| Isopropyl acetate | 1.0 |
| Alkyl alcohol aryl polyether | 1.0 |

Inks of various colors, based upon the above formula, are applied to the gelled plastisol sheet described above utilizing the printing cylinders of a conventional rotogravure printing press. The printing cylinders are run in a normal manner, producing the design that is printed in register. The inks are dried by subjecting the printed sheet to warm air impingement supplied by the enclosed drying zones of the press. The inks are not critical to the invention herein, but simply need be inks which are capable of adhering to and drying on the plastisol above described.

To the printed gelled plastisol above is applied a plastisol layer having the following formula:

| Ingredients | Parts by Weight |
| --- | --- |
| Poly(vinyl chloride) | 100 |
| Dioctyl phthalate (plasticizer) | 12 |
| 2,2,4-trimethyl-1,3-pentanediol monoisobutyrate, Nuoplaz 1046, Nuodex ink (non-staining plasticizer) | 27 |
| Barium-cadmium zinc phosphite (stabilizer) | 3 |
| 2,2,4-trimethyl-1,3-pentanediol diisobutyrate | 5 |
| Optical brightener | 0.005 |

The above plastisol was applied to the printed sheet as a wet film with a thickness of 8.5 mils (0.02 cm). It is fused by being heated to 325° F. (163° C.) in a hot air impingement oven for two minutes. This heating step will result in partial blowing of the azodicarbonamide blowing agent in the gelled first coat.

To this last-applied fused plastisol there is applied a clear 2 mil (0.005 cm) (dry) coating of a curable polyurethane. The polyurethane coating is a 55:45 xylene/resin solution containing catalyst. Heat is applied and the polyurethane coating is cured in three minutes' time. The heat applied will complete the decomposition of the blowing agent in the gelled first coat to convert it to a foam layer, and, will also cure the polyurethane coating. Heat is applied by passing the web through a three-stage oven which has the first stage heated to 270° F. (132° C.), second stage heated to 380° F. (193° C.), and the third stage heated to 340° F. (171° C.). The last coating applied is the wear layer surface of the resulting floor product which will be formed. Polyurethane coatings are applied to secure a product which will retain a hard, high gloss surface and eliminate the need for subsequent waxing by the user of the floor. Again, criticality does not particularly rest in the wear layer coating. It is only necessary that the coating be embossable when heated to a range of about 250° F. to 350° F. (121° C. to 177° C.). The invention is particularly applicable to a structure which constitutes a wear layer having thereunder a foam layer, and, it is desirable to emboss the wear layer without having too much heat retained in the foam layer so that the stability of the printed foam layer is damaged during embossing in registry with the printed pattern.

The above-described polyurethane coated sheet would be conveyed from the oven 3, wherein the polyurethane is cured and the foam is expanded, and directed towards the apparatus shown in the drawing herein. Coming from the oven, the above-described composite web composed of the backing sheet, the foam layer, the vinyl layer and the polyurethane coating would be at about 270° F. (132° C.) and would constitute the web 2 of the drawing. The web 2 would move past appropriate across-machine and along-machine guide structures towards the back wetting roll 12. Because the polyurethane wear surface would tend to lose heat a lot faster than a conventional vinyl wear surface, roll 16 would be provided with heat to engage the upper surface of the web, the polyurethane wear surface. The roll 16 would be heated to 200° F. to 250° F. (93° C. to 121° C.) to help maintain the temperature of the polyurethane wear surface to at least this level. The web would then pass to the backup roll 20 and embossing roll 22 and would be embossed. The embossing roll would be maintained at about 75° F. (24° C.) surface temperature and the backup roll would also be maintained at about 75° F. to 100° F. (24° C. to 38° C.) surface temperature. The product, as it passes between the nip of the embossing roll, which is the area between the roll 22 and 20, would have the polyurethane wear layer, or the top surface of the web, at a temperature of about 250° F. (121° C.). The back wetting, plus the cooling action of backup roll 20, will have cooled the temperature of the backing or carrier and the back of the foam layer adjacent thereto to a temperature of about 125° F. to 200° F. (52° C. to 93° C.). The cool embossing roll will immediately freeze the desired embossed pattern in the polyurethane wear layer at the time the embossing is carried out. The thickness of the web described above will be about 70 mils. The embossing pattern on the embossing roll comprises 55% to 60% of the total roll surface and the depth of the pattern on the roll is about 60 mils. Full embossing is carried out with both the land areas and valley areas engaging the web. Due to spring-back in the material, the end product has an embossed depth of 15 mils. The foam layer in the valley embossed areas will be somewhat compressed as compared to the foam in the non-embossed areas. The wrap around of the web around the backup roll 20 will constitute approximately 38% of the total surface area of the backup roll and the wrap around of the web around the embossing roll 20 will constitute about 8.5% of the total surface area of the embossing roll.

It has been found that the conventional poly(vinyl chloride) wear layers and foams, such as those disclosed in U.S. Pat. No. 3,741,851, all work equally well in the apparatus above-described.

What is claimed is:

1. A process for embossing a web of material wherein said material is composed of a composite structure having at least a carrier and a thick foam layer, said foam layer on the surface thereof adjacent the surface to be embossed having a decorative pattern printed thereon, said above composite structure being in the form of a web which is heated in an oven to a temperature of about 250° F. to 350° F., the steps comprising:

a. after the carrier of the web leaves the oven, wetting the carrier of the web, which is the back surface of the web, so as to lower the temperature of the back surface of the web approximately 100° below the top surface of the web, which is the surface to be embossed,
   b. embossing the top surface of the web with an embossing roll and backup roll,
   c. cooling the embossed surface of the web to set the embossed pattern in the web, and
   d. the improvement comprising:
      1. wrapping the web of material partially around the chilled steel backup roll prior to the time that the web passes between the nip of the backup roll and the embossing roll, to cool the backside of the web and secure good frictional contact between the web and backup roll so that good frictional drive exists between the web and backup roll,
      2. wrapping the embossed surface of the web around the embossing roll after it has passed through the nip between the embossing roll and the backup roll to partly cool the embossed surface of the web, and
      3. said wetting of the carrier of the web is carried out by two back-wetting operations, one back-wetting operation wets the carrier of the web just as it leaves the oven and the second back-wetting operation wets the carrier of the web just prior to the time the web is wrapped partially around the chilled steel backup roll.

2. The process of claim 1 wherein there is the further step of:
   a. controlling the registry of the embossed pattern with the printed pattern of the web so that the two patterns will be in registry.

3. The process of claim 1 wherein:
   a. the embossing step is carried out with both the land areas and valley areas of the embossing roll contacting and impressing a pattern on the top surface of the web.

4. The process of claim 1 wherein:
   a. a heating means applies heat to the embossable top surface of the web just prior to the time the embossing step is carried out.

5. A process for embossing a web of material wherein said material is composed of a composite structure having at least a carrier and a foam layer, said foam layer on the surface thereof adjacent the surface to be embossed having a decorative pattern printed thereon, said above composite structure being in the form of a web which is heated to a temperature of about 250° F. to 350° F., the steps comprising:

a. wetting the carrier of the web, which is the back surface of the web, so as to lower the temperature of the back surface of the web approximately 100° below the top surface of the web, which is the surface to be embossed,
   b. embossing the top surface of the web with an embossing roll and backup roll,
   c. cooling the embossed surface of the web to set the embossed pattern in the web, and
   d. the improvement comprising:
      1. wrapping the web of material partly around the chilled steel backup roll prior to the time that the web passes between the nip of the backup roll and embossing roll to cool the backside of the web and secure good frictional contact between the web and backup roll so that good frictional drive exists between the web and backup roll, the web drives the backup roll and the backup roll now drives the embossing roll, and 2. wrapping the embossed surface of the web around the embossing roll after it has passed through the nip between the embossing roll and the backup roll to partly cool the embossed surface of the web.

6. The process of claim 5 wherein there is the further step of:

a. controlling the registry of the embossed pattern with the printed pattern of the web so that the two patterns will be in registry.

7. The process of claim 5 wherein:

a. the embossing step is carried out with both the land areas and valley areas of the embossing roll contacting and impressing a pattern on the top surface of the web.

8. The process of claim 5 wherein:

a. a heating means applies heat to the embossable top surface of the web just prior to the time the embossing step is carried out.

9. In a process for embossing a web of material wherein said material is composed of a composite structure having at least a carrier and a foam layer, said foam layer on the surface thereof adjacent the surface to be embossed having a decorative pattern printed thereon, said above composite structure being in the form of a web which is heated to a temperature of about 250° F. to 350° F., the steps comprising:

a. wetting the carrier of the web, which is the back surface of the web, so as to lower the temperature of the back surface of the web approximately 100° below the top surface of the web, which is the surface to be embossed, b. embossing the top surface of the web with an embossing roll and backup roll, c. cooling the embossed surface of the web to set the embossed pattern in the web, and d. the improvement comprising:

1. wrapping the web of material partly around the chilled steel backup roll prior to the time that the web passes between the nip of the backup roll and embossing roll to cool the backside of the web and secure good frictional contact between the web and backup roll so that good frictional drive exists between the web and backup roll, the web drives the backup roll and the backup roll now drives the embossing roll, 2. wrapping the embossed surface of the web around the embossing roll after it has passed through the nip between the embossing roll and the backup roll to partly cool the embossed surface of the web, and 3. again, wrapping the web of material around the steel backup roll after it leaves the embossing roll to further cool the web of material.

* * * * *